Patented Feb. 6, 1923.

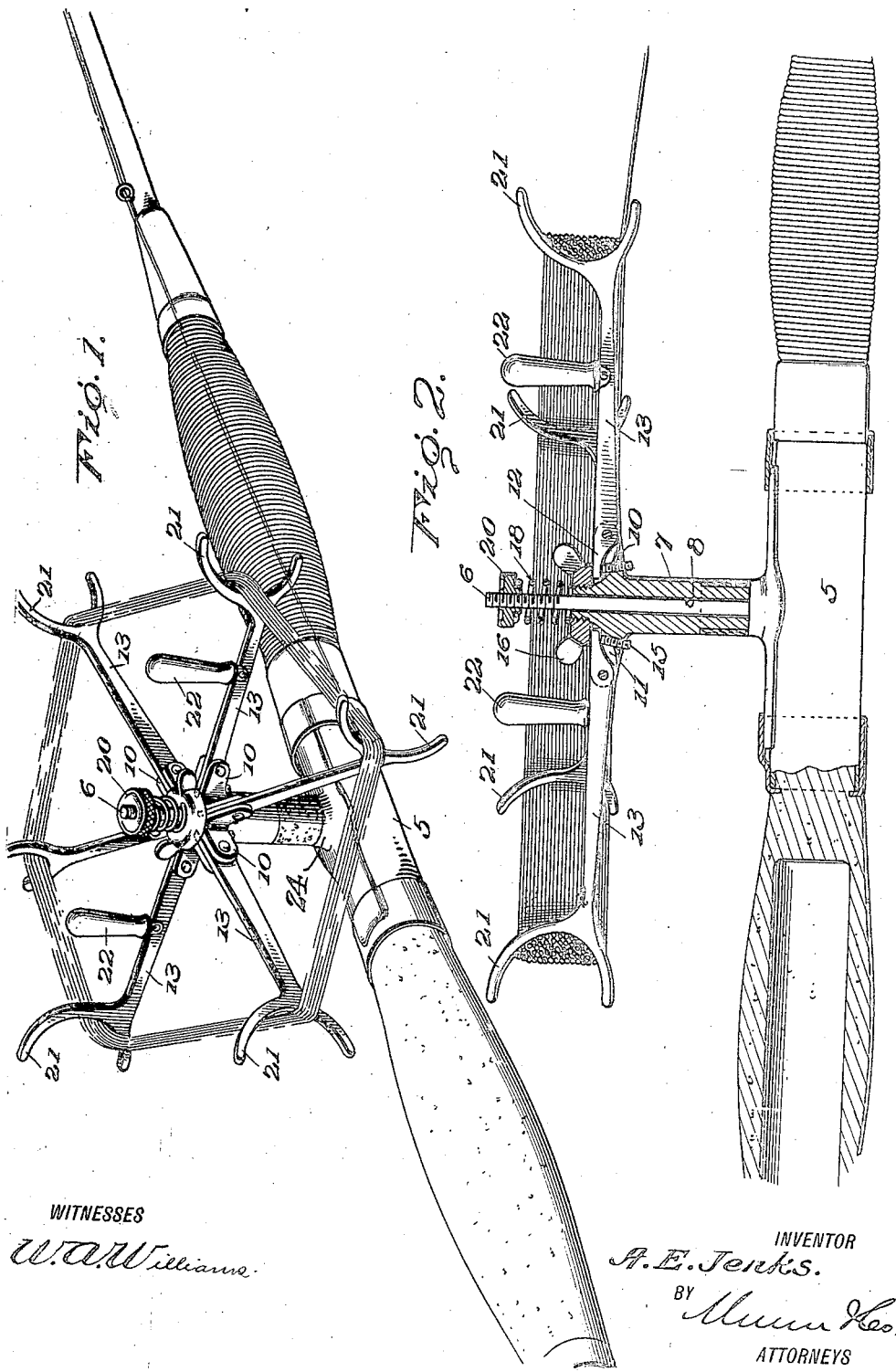

1,444,154

UNITED STATES PATENT OFFICE.

ALBERT ERNEST JENKS, OF THACKERY, OHIO.

REEL.

Application filed October 20, 1921. Serial No. 509,041.

*To all whom it may concern:*

Be it known that I, ALBERT E. JENKS, a citizen of the United States, and a resident of Thackery, in the county of Champaign and State of Ohio, have invented certain new and useful Improvements in Reels, of which the following is a specification.

An important object is to provide a reel for fishing rods having novel means whereby the same may be collapsed when not in use for arrangement in a small container.

A further object is to provide a reel of the class described having novel means whereby the wear on the arms or spokes may be taken up as the occasion requires.

A further object is to provide a reel whereby the line supported thereby may be readily dried.

A further object of the invention is to provide a reel of the class described which is simple to operate, of highly simplified construction and cheap to manufacture.

Other objects and advantages of the invention will be apparent during the course of the following description.

In the accompanying drawing forming a part of this application and in which like numerals are employed to designate like parts throughout the same.

Figure 1 is a perspective of the improved reel applied.

Figure 2 is a vertical sectional view of the same.

In the drawing, wherein for the purpose of illustration is shown a preferred embodiment of the invention, the numeral 5 designates a fishing rod provided with a spindle 6 about which the hub 7 of the improved reel is arranged. As illustrated in Figure 2, the hub 7 is provided with a longitudinally extending opening 8 which rotatably receives the spindle, the said spindle being supported by the rod.

With particular reference to Figures 1 and 2, it will be noted the hub 7 is provided adjacent its upper end with a series of radial arms 10 having longitudinally extending grooves 11 which increase in depth toward the outer ends of the arms and pivotally receive the inner terminal portions 12 of the spokes 13. The spokes 13 are pivoted within the slots 11 as indicated at 14 and when extended as illustrated in Figure 1, the spokes engage the upper ends of set screws 15. The set screws 15 are threaded through the under sides of the arms 10 and are arranged in the path of travel of the inner reduced terminal portions 12 of the spokes 13 so as to limit the downward movement of the spokes and to take up the wear on the inner terminal portions 12. As the occasion requires, the set screws 15 may be adjusted so as to position the spokes 13 in the same horizontal plane when extended.

The spokes 13 are held in their extended positions by means of a retaining member in the nature of a wing nut 16 which is mounted upon the threaded upper end of the hub and engages the inner terminal portions 12 of the spokes 13 so as to hold the said inner terminal portions in engagement with the set screws 15. By reason of this construction, the spokes 13 are securely held in the extended position, as illustrated in Figure 1.

The wing nut 16 is engaged by a coil spring 18 which is in turn engaged by a thumb nut 20 threaded on the terminal portion of the spindle 6. When it is desired to permit the hub 7 and the spokes 13 to freely rotate for winding or unwinding the reel, the thumb nut 20 is loosened so as to lessen the pressure exerted by the coil spring on the wing nut 16. Thus, the hub 7 and the spokes 13 may freely rotate. On the other hand, when it is desired to retard the rotation of the reel, the thumb nut 16 is turned so as to increase the pressure exerted by the coil spring 18.

The outer portions of the spokes 13 are formed with forks 21 adapted to be engaged by a fishing line in the usual manner. When it is desired to wind the fishing line on the reel, handles 22 carried by the spokes may be moved in an annular path for winding the reel.

With reference to Figure 1, it will be observed that the base of the reel is provided with an upstanding post 24 which constitutes a thumb rest when the device is in use.

In operation the coiled spring exerts a downward pressure on the hub 7 and thereby acts as a brake in preventing excessive speed of the reel and thus preventing back lashing of the line.

A reel constructed in accordance with this invention is level winding or winds in a horizontal plane and the line therefore needs no attention if kept taut enough to be straight while winding it in.

As illustrated in Figure 2 the lower portion of the hub 7 is provided with a cork band adapted to be engaged by the thumb of the operator when starting the cast. The cork is light, easy on the thumb and does not wear out readily.

Further with reference to the Figure 1 it will be observed that the reel may be readily collapsed with line engaged with the forks by merely securing said line to the forks by small rubber bands. A small number of rubber bands are sufficient to hold the line from tangling, thereby dispensing with the necessity of employing springs or clips for this purpose.

The reel forming the subject matter of this application may be readily and conveniently folded by merely releasing the nut 16 and permitting the arms or spokes 13 to assume the position illustrated in Figure 2. When thus positioned, the spokes 13 occupy but a small amount of space and may be conveniently folded in a small box.

Having thus described the invention, what is claimed is:—

1. A fishing reel comprising a hub having a plurality of radial arms provided with grooves gradually increasing in depth toward the outer ends of the arms, spokes having their inner portions pivoted to said arms and extended into said grooves, and a nut threaded on said hub and engaging said spokes.

2. A fishing reel comprising a hub having a plurality of radial arms provided with grooves, spokes having their inner portions pivoted to said arms and extended into said grooves, and set screws carried by said arms and extending into said grooves for engagement with the inner terminal portions of said spokes.

3. A fishing reel comprising a hub having a plurality of radial arms provided with grooves, spokes having their inner portions pivoted to said arms and extended into said grooves, set screws carried by said arms and extending into said grooves for engagement with the inner terminal portions of said spokes, and means to hold said spokes in their extended positions.

4. A fishing reel comprising a hub having a plurality of radial arms provided with grooves, spokes having their inner portions pivoted to said arms and extended into said grooves, set screws carried by said arms and extending into said grooves for engagement with the inner terminal portions of said spokes, means to hold said spokes in their extended positions, and a spindle rotatably supporting said hub.

5. A reel comprising a hub having a plurality of radial arms provided with grooves, spokes having their inner portions extended in said grooves, means carried by the terminals of said arms for pivotally supporting said spokes, set screws carried by the arms and arranged in the path of travel of the inner terminal portions of said spokes whereby to limit the pivotal movement of the spokes, a spindle rotatably supporting said hub, a nut mounted on the hub and engaging said spokes, a coil spring engaging said nut, and a second nut to tension said spring.

6. A reel comprising a hub having a plurality of radial arms provided with grooves, spokes having their inner portions extended in said grooves, means carried by the terminals of said arms for pivotally supporting said spokes, a spindle rotatably supporting said hub, a nut mounted on the hub and engaging said spokes, a coil spring engaging said nut, a second nut to tension said spring, and a spindle extending through said hub.

7. A reel comprising a hub having arms, spokes pivoted to said arms, and adjustable set screws carried by the arms and arranged in the path of travel of the spokes whereby to limit the pivotal movement of the same.

8. A reel comprising a hub having arms, spokes pivoted to said arms, set screws carried by the arms and arranged in the path of travel of the spokes whereby to limit the pivotal movement of the same, and a nut threaded on the hub and engaging the spokes whereby to cooperate with the set screws in holding the spokes against pivotal movement.

9. A reel comprising a hub having arms, spokes pivoted to said arms, set screws carried by the arms and arranged in the path of travel of the spokes whereby to limit the pivotal movement of the same, a nut threaded on the hub and engaging the spokes whereby to cooperate with the set screws in holding the spokes against pivotal movement, and a spindle rotatably supporting the hub.

10. A reel comprising a hub having arms, spokes pivoted to said arms, set screws carried by the arms and arranged in the path of travel of the spokes whereby to limit the pivotal movement of the same, a nut threaded on the hub and engaging the spokes whereby to cooperate with the set screws in holding the spokes against pivotal movement, a spindle rotatably supporting the hub, and a coiled spring mounted on the spindle and confined between one end of the hub and the outer portion of the spindle.

11. A reel comprising a hub having arms, spokes pivoted to said arms, set screws carried by the arms, and arranged in the path of travel of the spokes whereby to limit the pivotal movement of the same, a nut threaded on the hub and engaging the spokes whereby to cooperate with the set screws in holding the spokes against pivotal movement, a spindle rotatably supporting the hub, a coiled spring mounted on the spindle and confined between one end of the hub and the outer portion of the spindle, said spindle being provided with a nut forming an adjusting means for said spring.

ALBERT ERNEST JENKS.